W. A. SCOTT, Jr.
VENTILATOR FOR WINDOWS.
APPLICATION FILED MAY 26, 1910.
985,944.
Patented Mar. 7, 1911.
2 SHEETS—SHEET 1.
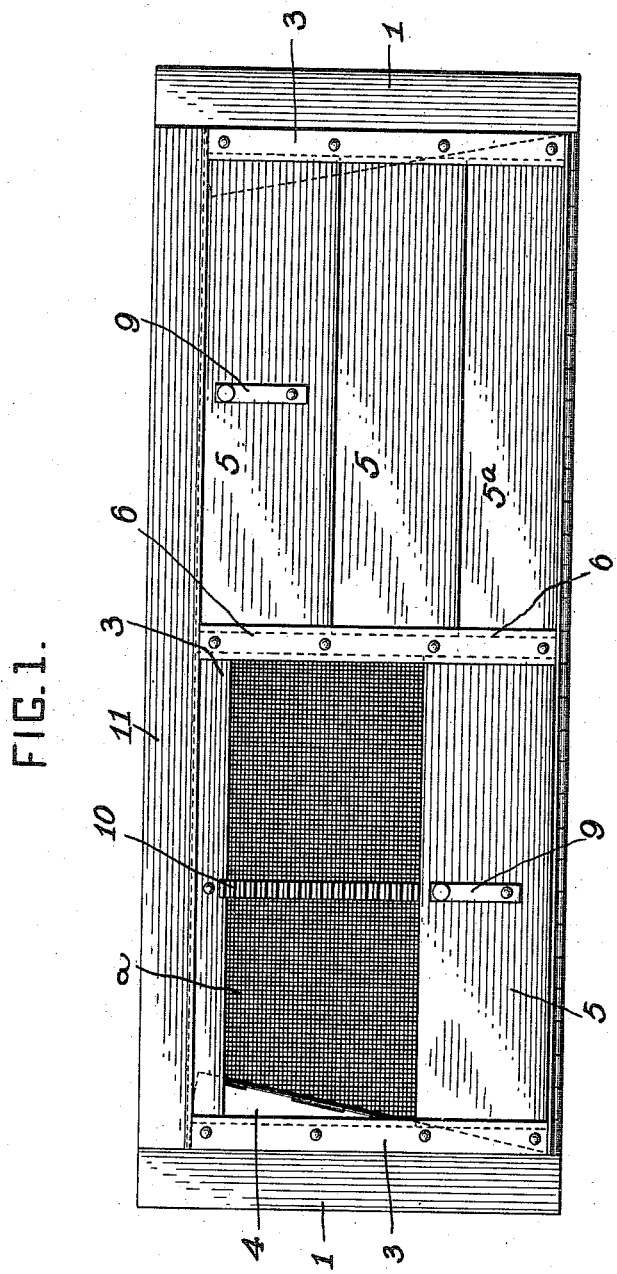
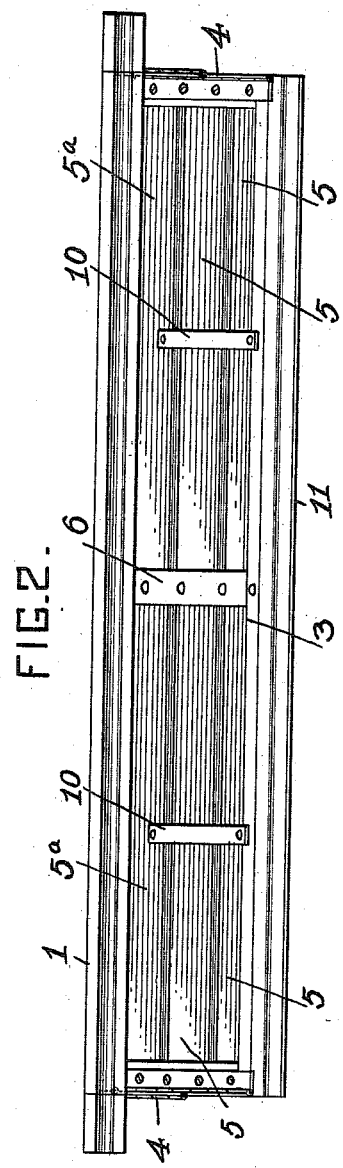

W. A. SCOTT, Jr.
VENTILATOR FOR WINDOWS.
APPLICATION FILED MAY 26, 1910.

985,944.

Patented Mar. 7, 1911.

2 SHEETS—SHEET 2.

WITNESSES:
J. Herbert Bradley.
Thos. Jellett

INVENTOR
William A. Scott, Jr.
by Demeril B. Wolcott Atty

UNITED STATES PATENT OFFICE.

WILLIAM A. SCOTT, JR., OF PITTSBURG, PENNSYLVANIA.

VENTILATOR FOR WINDOWS.

985,944. Specification of Letters Patent. Patented Mar. 7, 1911.

Application filed May 26, 1910. Serial No. 563,604.

*To all whom it may concern:*

Be it known that I, WILLIAM A. SCOTT, Jr., residing at Pittsburg, in the county of Allegheny and State of Pennsylvania, a citizen of the United States, have invented or discovered certain new and useful Improvements in Ventilators for Windows, of which improvements the following is a specification.

The invention described herein relates to certain improvements in ventilating screens for windows and has for its object a construction whereby the inflow of air may be regulated and directed as required. The invention is hereinafter more fully described and claimed.

Figure 3:
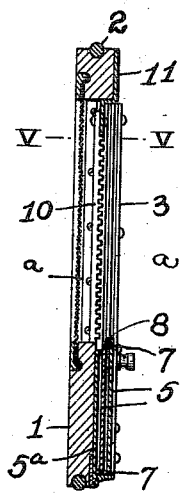
Figure 4:
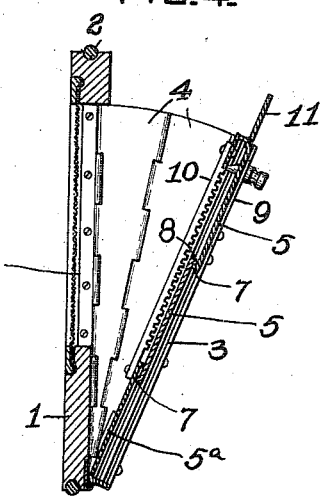
Figure 5:
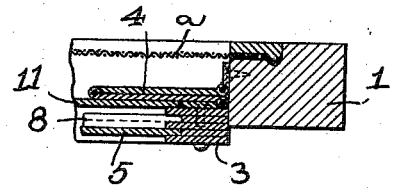
Figure 6:
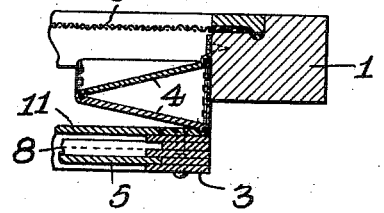
Figure 7:
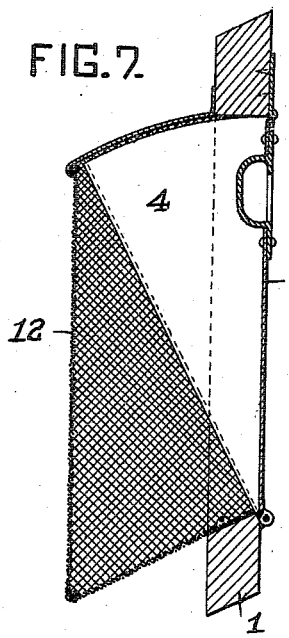
Figure 8:
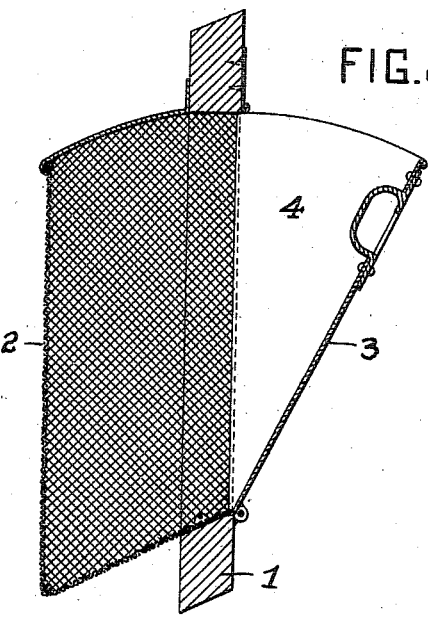

In the accompanying drawings forming a part of this specification, Figure 1 is a front elevation of my improved screen, the leaves at the end being lowered; Fig. 2 is a top plan view showing the shutter open. Figs. 3 and 4 are sectional views, the shutter being shown closed and the leaves lowered in Fig. 3, but in reverse positions in Fig. 4. Figs. 5 and 6 are sectional views on a plane indicated by the line V—V, Fig. 3, the shutter being shown in open and partly closed positions respectively. Figs. 7 and 8 are sectional views illustrating a modification of my improvement, the shutter being shown in closed and open positions in the respective views.

In the practice of my invention, the substantially rectangular frame 1, which is hereinafter termed the screen frame, is provided along its edges with resilient parting strips 2, and has a wire netting *a* having a fine mesh covering the opening to prevent the entry of cinders, etc. A shutter 3 is hinged at its lower edge to the lower bar of the screen frame 1 in such manner that when shut it will entirely close the opening through the screen frame, and when in open position will deflect the flowing air upwardly. The shutter is also provided with end pieces 4 to prevent, when the shutter is open, any lateral flow of the air.

In the construction shown in Figs. 1 to 6 inclusive, the shutter consists of a rectangular frame, preferably formed of metal, and leaves 5 movably molded in the shutter frame. Where the frame is long it is preferred that it be divided into sections by a transverse bar or member 6, as shown in Figs. 1 and 2, and the leaves which are made in sections are arranged to slide in grooves in the end and intermediate vertical bars of the shutter frame. The number of leaves employed will of course depend upon the width of the opening in the screen frame. The leaves are provided along adjacent edges with interlocking members as the flanges 7 and 8, so that when one leaf is being raised to closed position, it will after a predetermined movement draw the adjacent leaf to closed position. When the controlling leaf is lowered the other leaf or leaves will drop in succession. Any suitable means may be employed for holding the leaves in closed or partly closed position, as, for example, a spring catch 9 carried by the controlling leaf and adapted to engage a toothed bar 10 arranged transverse of the shutter frame. The construction of shutter shown in Figs. 1 to 6 inclusive is substantially to the construction described and claimed in Letters Patent No. 935,864 granted to me.

In order to prevent the direct inflow of air when the shutter is turned out, the lower leaf 5ª is made stationary, it preferably being made integral with and attached to the shutter frame. If the shutter frame is made of such width that its upper edge coincides, when closed, with the lower side of the top bar of the screen frame, there would be a direct inflow of air over the upper edge of the shutter when in open position. To prevent such direct flow, the shutter frame is provided with extension 11 adapted to lie flat against the top bar of the frame 1, when the shutter is closed, and of such a width as to prevent direct inflow when the shutter is open.

In order that the shutter may be opened a substantial distance and may fold close against the frame 1, the end pieces 4 are made foldable. As for example, in the construction shown, these end pieces are made in sections hinged together and also to the screen frame 1 and to the shutter in such manner that when the latter is closed the end pieces will fold in as shown in Figs. 1, 5 and 6.

In the construction shown in Figs. 7 and 8, the end pieces 4 are made rigid and preferably integral with the shutter, so that when the latter is closed these end pieces will extend through the frame 1 and project a considerable distance on the opposite side. Such projection of the end pieces 4 would prevent the attachment of the wire mesh, as in Figs. 1 to 6, hence a hood 12 is secured to the frame 1 in such manner as to inclose the opening therein. This hood is made with a solid or imperforate top, while the sides, outer wall and bottom are made of a fine meshed wire netting.

I claim herein as my invention:

1. A ventilator for windows having in combination a screen frame, a shutter hinged to the frame and provided with end pieces to prevent a lateral flow of air, and wire netting adapted to prevent the passage of cinders, etc., through the frame.

2. A ventilator for windows having in combination a screen frame, a shutter frame hinged to the screen frame, a series of leaves movably mounted therein, and folding end pieces connected to the screen and shutter frames.

3. A ventilator for windows having in combination a screen frame, a shutter frame hinged to the screen frame, and a series of leaves movably mounted therein and interlocking one with the other, means for locking the leaves in closed or intermediate positions, and foldable end pieces connecting the screen and shutter frames.

4. A ventilator for windows having in combination a screen frame, a shutter frame having a width greater than that of the opening of the screen frame and so hinged to the latter that its upper member will over-lap the upper member of the screen frame, a series of leaves movably mounted in the shutter frame, and foldable end pieces connected to the screen and shutter frames.

5. A ventilator for windows having in combination a screen frame, a shutter hinged to the frame and consisting of a series of relatively movable leaves, and foldable end pieces connected to the frame and shutter.

In testimony whereof, I have hereunto set my hand.

WILLIAM A. SCOTT, JR.

Witnesses:
ALICE A. TRILL,
THOS. J. ELBEL.

---

Copies of this patent may be obtained for five cents each, by addressing the "Commissioner of Patents, Washington, D. C."